(12) United States Patent
Shahbaz

(10) Patent No.: US 10,387,114 B1
(45) Date of Patent: Aug. 20, 2019

(54) SYSTEM TO ASSIST VISUALLY IMPAIRED USER

(71) Applicant: Manouchehr Shahbaz, Houston, TX (US)

(72) Inventor: Manouchehr Shahbaz, Houston, TX (US)

( * ) Notice: Subject to any disclaimer, the term of this patent is extended or adjusted under 35 U.S.C. 154(b) by 0 days.

(21) Appl. No.: 16/132,438

(22) Filed: Sep. 16, 2018

(51) Int. Cl.
| *G06F 3/16* | (2006.01) |
| *G02C 11/00* | (2006.01) |
| *H04N 5/232* | (2006.01) |
| *G09B 21/00* | (2006.01) |

(52) U.S. Cl.
CPC .............. *G06F 3/167* (2013.01); *G02C 11/10* (2013.01); *G09B 21/006* (2013.01); *H04N 5/23203* (2013.01)

(58) Field of Classification Search
None
See application file for complete search history.

(56) References Cited

U.S. PATENT DOCUMENTS

| 2011/0216179 A1* | 9/2011 | Dialameh | A61H 3/061 348/62 |
| 2013/0127735 A1* | 5/2013 | Motoyama | G06F 3/041 345/173 |
| 2014/0184384 A1* | 7/2014 | Zhu | G09B 21/003 340/4.12 |
| 2015/0141085 A1* | 5/2015 | Nuovo | G06F 1/1633 455/575.1 |
| 2016/0127698 A1* | 5/2016 | Mali | H04N 7/185 348/62 |
| 2016/0182826 A1* | 6/2016 | Blum | H04N 5/23241 348/372 |
| 2016/0259410 A1* | 9/2016 | Moore | G06F 3/016 |
| 2017/0213478 A1* | 7/2017 | Kohn | G09B 21/006 |
| 2018/0012376 A1* | 1/2018 | Dayal | G06T 7/80 |
| 2018/0062691 A1* | 3/2018 | Barnett, Jr. | H04B 1/401 |
| 2018/0189567 A1* | 7/2018 | Maheriya | G06T 7/536 |

* cited by examiner

*Primary Examiner* — Neeraj Sharma
(74) *Attorney, Agent, or Firm* — Matthew Zarghouni

(57) ABSTRACT

The present invention relates to a system for a visually impaired user comprising a micro camera coupled to an eye wear, proximity sensors coupled to the wearable objects and the handheld electronic device coupled to both micro camera & proximity sensor and to the database. The visually impaired user instructs the micro camera and proximity sensors through his handheld electronic device to capture the data of proximally placed objects, places or people. The captured data of both the micro camera and the proximity sensors provides the complete information about the captured object, place or people and transmit it to the database of the handheld electronic device. This captured data is then processed by the database and the relevant audio output, corresponding to the captured data, is transmitted to the ear wear or the speaker of the handheld electronic device.

16 Claims, 2 Drawing Sheets

SYSTEM TO ASSIST VISUALLY IMPAIRED USER

FIELD OF THE INVENTION

The present invention relates to the system to assist the visually impaired user comprising a micro camera and proximity sensor to capture the complete information of the proximally placed objects, place or people.

BACKGROUND

Life of a visually impaired person is difficult as compared to other people. They have very limited choices when moving or walking from one place to another or finding their own objects. Sometimes, these simple acts of walking and finding their own objects turn out to be dangerous or harmful for them. Therefore, they have to either employ the services of another person or use the help of a guide dog which will assist them in walking and fetching objects of their use. But when the vicinity of the visually impaired person is known to him, he does not hire a person or a dog and has to face difficulties even with the slightest change. Most of the times the visually impaired person wants themselves to identify certain objects without the aid of another. Therefore, the visually impaired person relies highly on their other senses to do the activities.

Based on this, there are many devices available in the market for visually impaired users which assist them in accomplishing various tasks such as reading, typing, finding their objects, navigating face recognition, browsing Internet etc. Patents such as U.S. Pat. Nos. 6,497,367, 5,917,174, 5,971,279 illustrates the technologies using the barcode readers for finding the objects of the visually impaired user. Since, the use of this technology engaged the visually impaired to carry the barcode reader in their hands and they had to scan every object placed in their vicinity, the process became highly undesirable and time consuming. To overcome the limitations of the prior arts, the invention US20050208457 bought the use of camera coupled to an eye wear for finding the objects of the visually impaired users. But as the line of sight of the camera used in this invention was limited it was not efficient enough to determine the complete data of the proximally placed objects. Therefore, the visually impaired user had to face difficulties while searching for objects. Moreover, this invention was also unable to warn the visually impaired users when there was any obstacle in their path. The invention US20130035742 overcome the limitations of the invention US20050208457 by providing the high resolution camera to assists the visually impaired user for providing the information about the person standing next to him. Since, this invention had a limitation of face recognition only it was not able to detect the objects placed in the surroundings of the visually impaired user.

Therefore, a need exist for such a system which accurately navigate, find objects and recognize the face of the person for the visually impaired user.

SUMMARY

The main objective of the present invention is to overcome the limitations of the prior arts by providing a system comprising a micro camera and at least one proximity sensor which captures the complete data of the proximally placed objects, places and person and enable the visually impaired user to perform his task independently and easily.

In order to achieve the above mentioned objective, the present invention provides a system comprising a micro camera coupled to an eye wear, at least one proximity sensor coupled to at least one wearable object, a handheld electronic device coupled to a database, wherein the visually impaired user commands the handheld electronic device to actuate the micro camera and the proximity sensors. The micro camera and the proximity sensors capture the data of the proximally placed objects, places or people. Since, the micro camera alone is unable to capture the complete information of the proximally placed objects, places or people, the proximity sensors enables the system to provide more information and add more accuracy to the data captured by the micro camera. The captured data of the micro camera and the proximity sensors is then transmitted to the handheld electronic device. The handheld electronic device receives the captured data and transmits it to the database. The database processes the captured data by analysing the data of both the micro camera and the proximity sensors together and transmits the relevant audio data output, corresponding to the captured data, to the handheld electronic device. Upon receiving the relevant audio data output the handheld electronic device transmits it to the ear wear or to the speaker of the handheld electronic device, through which the visually impaired user is able to listen to it. The audio data output also includes the warnings to the visually impaired user if there is any harm or danger in his vicinity.

DETAILED DESCRIPTION OF THE DRAWINGS

Figure 1:
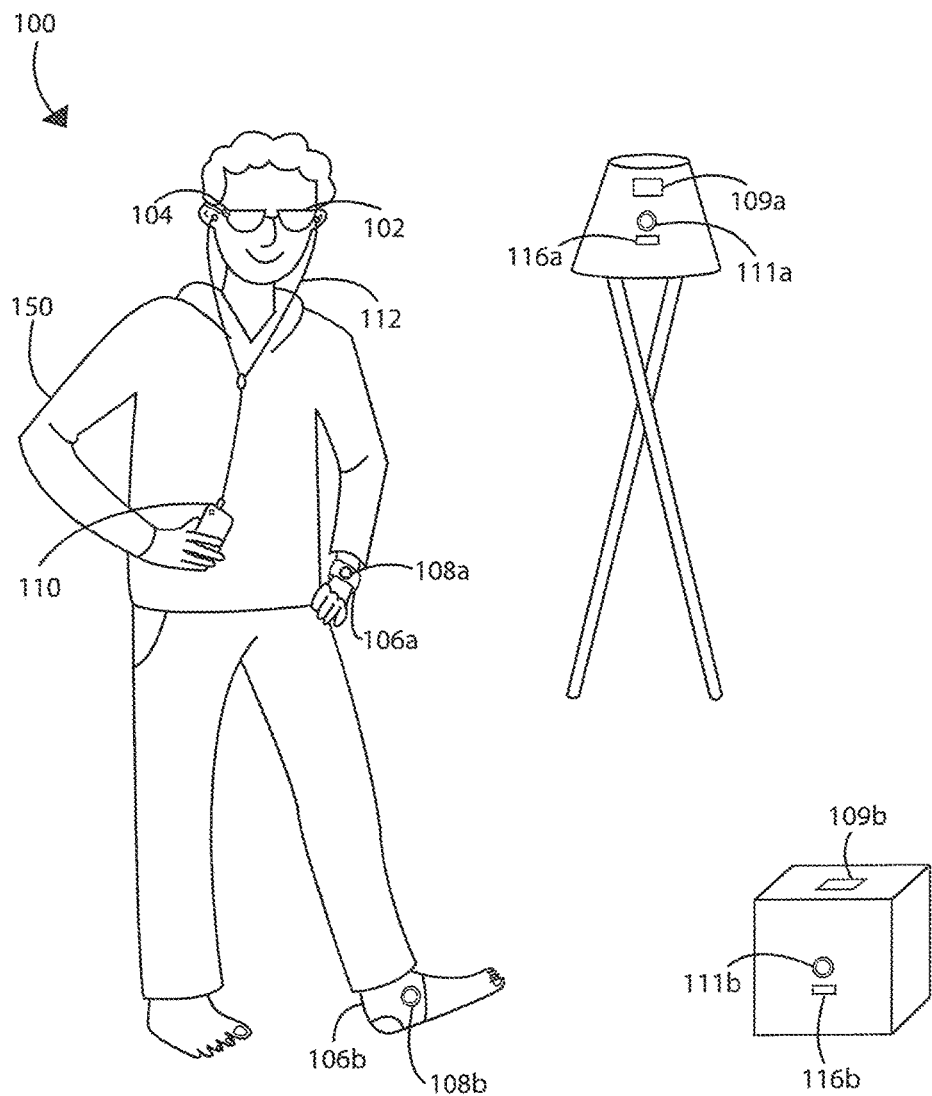
FIG. 1 illustrates the frontview of the visually impaired user 200 with the system 100.

Reference will now be made in detail to the exemplary embodiment (s) of the invention, examples of which are illustrated in the accompanying drawings. Whenever possible, the same reference numerals will be used throughout the drawings to refer to the same or like parts.

FIG. 1 illustrates the front view of the visually impaired user 200 with the system 100. The system 100 comprises an eye wear 102 coupled to a micro camera 104, wearable objects 106a & 106b coupled to proximity sensors 108a & 108b, objects placed proximally to the visually impaired user 150 are coupled to at least one of the device IDs 109a & 109ba & 109a & 109bb or to the sensors 111a & 111ba & 111a & 111bb wherein the sensors 111a & 111ba & 111a & 111bb are coupled to their respective speakers 116a & 116b. The visually impaired user 150 also holds the handheld electronic device 110 coupled to the micro camera 104 & proximity sensors 108a & 108b of the system 100.

Figure 2:
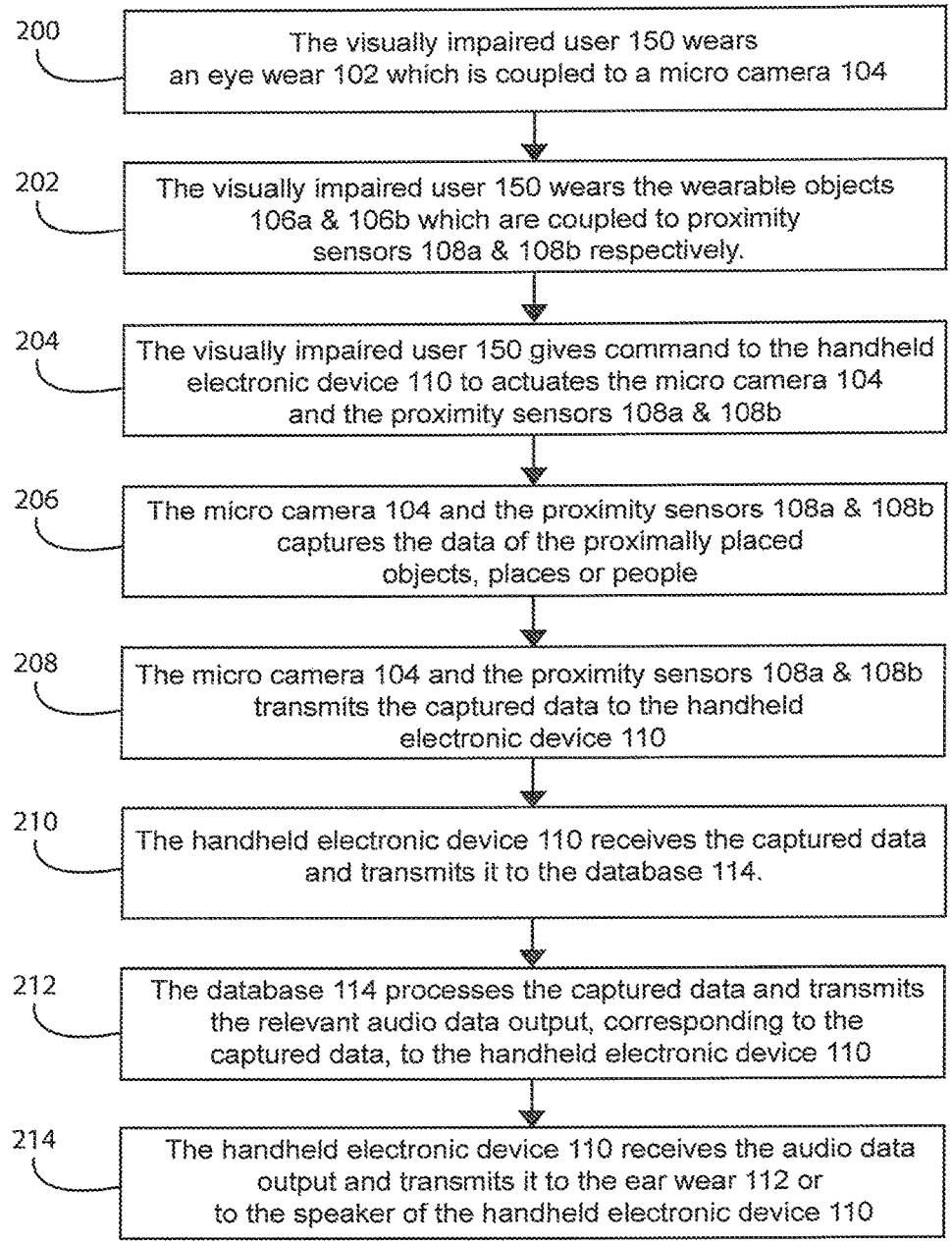
FIG. 2 illustrates the flow diagram describing the overview of the invention.

FIG. 2 illustrates the flow diagram describing the overview of the invention.

Step 200: With reference to FIG. 1 the visually impaired user 150 wears an eye wear 102 which is coupled to a micro camera 104.

Step 202: With reference to FIG. 1 the visually impaired user 150 wears the wearable objects 106a & 106b which are coupled to proximity sensors 108a & 108b respectively.

Step 204: The visually impaired user 150 gives command to the handheld electronic device 110 to actuates the micro camera 104 and the proximity sensors 108a & 108b.

Step 206: The micro camera 104 and the proximity sensors 108a & 108b captures the data of the proximally placed objects, places or people.

Step 208: The micro camera 104 and the proximity sensors 108a & 108b transmits the captured data to the handheld electronic device 110.

Step 210: The handheld electronic device 110 receives the captured data and transmits it to the database 114.

Step 212: The database 114 processes the captured data and transmits the relevant audio data output, corresponding to the captured data, to the handheld electronic device 110.

Step 214: The handheld electronic device 110 receives the audio data output and transmits it to the ear wear 112 or to the speaker of the handheld electronic device 110.

In the preferred embodiment, the visually impaired user 150 is in the vicinity which is either known or unknown to him. The visually impaired user 150 wears an eye wear 102 which is coupled to a micro camera 104 and the wearable objects 106a & 106b which are coupled to their respective proximity sensors 108a & 108b. Herein, the eye wear 102 is at least one of a spectacle or a sunglasses, the wearable objects 106a & 106b is at least one of the apparels, the ankle braces, the wrist braces, the bands, the rings, the chains, the shoes or any other wearable objects and the ear wear 112 is at least one of a ear wear. Bluetooth head phones, a bluetooth headset, a mini wireless ear piece or any other wireless ear piece. The visually impaired user 150 also have a handheld electronic device 110, wherein the handheld electronic device 110 is at least one of a mobile device, a smart phone, a tablet, a smart watch, or any other computing device. The visually impaired user 150 commands the handheld electronic device 110 to actuate the micro camera 104 and the proximity sensors 108a & 108b. The micro camera 104 and the proximity sensors 108a & 108b capture the complete data of the proximally placed objects, places or people. The captured data of objects includes the information such as but not limited to the name, the shape, the size, the number, the location, the information written on the objects or distance from the visually impaired user 150. The captured data for places includes information such as but not limited to the name, the location, the steps needed to cover the place, the path (indoors or outdoors) on which the visually impaired user 150 is about to walk such as whether the path is straight or have curves, the steps needed to cover the curves if there are any, have stairs or not, the number of the stairs if there are any, objects placed in the path which will obstructs or provide harm to the visually impaired user 150. The captured data for people includes information such as but not limited to the name, the number, the facial recognition, the voice recognition and the position of a person with respect to the visually impaired user 150. Since, the micro camera 104 alone is unable to capture the complete information of the objects, places or people, the proximity sensors 108a & 108b enables the system 100 to provide more information and add more accuracy to the data captured by the micro camera 104. The captured data of the micro camera 104 and the proximity sensors 108a & 108b is then transmitted to the handheld electronic device 110. The handheld electronic device 110 receives the captured data and transmits it to the database 114. The database 114 processes the captured data by analysing the data of both the micro camera 104 and the proximity sensors 108a & 108b together and outputs the relevant audio data output, corresponding to the captured data, to the handheld electronic device 110. Upon receiving the relevant audio data output the handheld electronic device 110 transmits it to the ear wear 112 or to the speaker of the handheld electronic device 110, through which the visually impaired user 150 is able to listen to the audio output. The audio data output also includes the warnings to the visually impaired user 150 if there is any harm or danger in his vicinity.

In other embodiment, the visually impaired user 150 is in the vicinity which is known to him such as but not limited to home or office, wherein the objects placed in his known vicinity are coupled to at least one device 11) 109a & 109bb. The device ID 109a & 109bb enables the mobile camera 104 of the system 100 to capture complete data of the coupled objects so as to differentiate between two similar products, wherein the device ID 109a & 109bb is at least one of a barcode, a QR code, a RFID, an IME or a Tag. Therefore, when the visually impaired user 150 commands the handheld electronic device 110 to actuate the micro camera 104 and the proximity sensors 108a & 108b, the micro camera 104 captures the data of the proximally placed objects, places, people and also the data of objects which are coupled to device ID 109a & 109bb and the proximity sensors 108a & 108b captures the data of only proximally placed objects, places or people. The captured data of the micro camera 104 and the proximity sensors 108a & 108b is then transmitted to the handheld electronic device 110. The handheld electronic device 110 receives the captured data and transmits it to the database 114. The database 114 processes the captured data by analysing the data of both the micro camera 104 and the proximity sensors 108a & 108b together and outputs the relevant audio data output, corresponding to the captured data, to the handheld electronic device 110. Upon receiving the relevant audio data output the handheld electronic device 110 transmits it to the ear wear 112 or to the speaker of the handheld electronic device 110, wherein the information such as but limited to the name, the shape, the size, the number, the location and the information written on the objects coupled to the device ID 109a & 109b is exclusively audible to the visually impaired user 150.

In another embodiment, the visually impaired user 150 is in the vicinity which is known to him such as but not limited to home or office, wherein the objects placed in his known vicinity are coupled to at least one device ID 109a & 109b. The device ID 109a & 109b enables the handheld electronic device 110 of the system 100 to capture complete data of the coupled objects so as to differentiate between two similar products, wherein the device ID 109a & 109b is at least one of a barcode, a QR code, a RFID, an IMEI or a Tag.

The visually impaired user 150 wears an eye wear 102 which is coupled to a micro camera 104 and the wearable objects 106a & 106b which are coupled to their respective proximity sensors 108a & 108b. The visually impaired user 150 holding the handheld electronic device 110 commands it to actuate the micro camera 104 and the proximity sensors 108a & 108b. The micro camera 104 & proximity sensors 108a & 108b capture the data of the proximally placed objects, places, people and the short range communication of the handheld electronic device 110 such as but not limited to bluetooth, infrared, zigbee or any other communication following under IEEE 802.11G captures the data of the objects having unique ID codes. The captured data of the micro camera 104 and the proximity sensors 108a & 108b is transmitted to the handheld electronic device 110. The handheld electronic device 110 receives the captured data and transmits it to the database 114. The handheld electronic device 110 also transmits its captured data of the objects with device ID 109a & 109b to the database 114. The database 114 processes the received data by analysing the data of micro camera 104 & proximity sensors 108a & 108b together with the data captured by handheld electronic device 110. The processed data is transmitted as a relevant audio data output, corresponding to the received data, to the handheld electronic device 110. Upon receiving the relevant audio data output the handheld electronic device 110 transmits it to the ear wear 112 or to the speaker of the handheld electronic device 110, wherein the information such as but limited to the name, the shape, the size, the number, the location and the written on the objects coupled to the device ID 109a & 109b is exclusively audible to the visually impaired user 150.

In yet another embodiment, the visually impaired user 150 is in the vicinity which is known to him such as but not limited to home or office, wherein the objects placed in his known vicinity are coupled to at least one sensor 111a & 111b. These sensors 111a & 111b are voice controlled sensors and provide an audio output through the speakers 111a & 111ba coupled to them. The visually impaired user 150 wears an eye wear 102 which is coupled to a micro camera 104 and the wearable objects 106a & 106b which are coupled to their respective proximity sensors 108a & 108b. The visually impaired user 150 holding the handheld electronic device 110 commands it to actuate the micro camera 104, the proximity sensors 108a & 108b and the sensors 111a & 111b. The micro camera 104 and proximity sensors 108a & 108b capture the data of the proximally placed objects, places or people. The captured data of the micro camera 104 and the proximity sensors 108a & 108b is then transmitted to the handheld electronic device 110. The sensors 111a & 111b also transmit the data of its coupled object to the handheld electronic device 110, wherein the data of the coupled object includes the information such as but not limited to the name, the shape, the size, the number, the location and the written on the object. The handheld electronic devices 110 receive the captured data from the micro camera 104, the proximity sensors 108a & 108b and the sensors 111a & 111b. The received data is transmits it to the database 114 through the handheld electronic device 110. The database 114 processes the received data and transmits the relevant audio data output, corresponding to the captured data, to the handheld electronic device 110. Upon receiving the relevant audio data output from the database 114 the handheld electronic device 110 transmits it to the ear wear 112 or to the speaker of the handheld electronic device 110 and also to the speaker of the sensors 111a & 111b, wherein the speaker 116a & 116b of the sensors 111a & 111b determine the complete data of the object placed proximally to the visually impaired user 150.

In the present invention, the micro camera is coupled to an eye wear by at least one of integral or removable means. At least one proximity sensor is coupled to at least one wearable objects by at least one of integral or removable means. The micro camera & proximity sensors are wirelessly coupled to the handheld electronic device, wherein the handheld electronic device is also wirelessly coupled to the database. Moreover, the ear wear is coupled to the handheld electronic device by at least one of wireless or wired means.

In yet another embodiment of the present invention, nearby places, objects consists of voice controlled sensors. When the visually impaired user speaks about the particular object then that particular object recognize the voice and voice controlled sensor respond to a pre-defined message to the visually impaired user. The voice controller sensor can transmit the audio signal to the handheld electronic device using short range communication or RF communication means or can playback the recorded message of the corresponding device.

Although the exemplary embodiments of the present invention have been described for illustrative purposes, those skilled in the art will appreciate the system 100 for a visually impaired user 150 comprising a micro camera 104 and proximity sensors 108a & 108b coupled to a handheld electronic device 110 for capturing the complete data of the proximally placed objects, places or people, process the captured data through its database 114 also coupled to the handheld electronic device 110 device and enable the visually impaired user 150 to hear the audio output through the handheld electronic device 150.

What is claimed is:

1. A system to assist a visually impaired user, wherein the system comprising:
    a micro camera coupled to an eye wear, wherein the micro camera captures the data of the proximally placed objects, places, people or the combination thereof;
    proximity sensors coupled to at least one wearable object, wherein the proximity sensor captures the data of the proximally placed objects, places, people or combination thereof;
    a handheld electronic device, coupled to the micro camera and to the proximity sensor, wherein the handheld electronic device receives the captured data from the micro cameras and the proximity sensors;
    a database, coupled to the handheld electronic device, receives the captured data from the handheld electronic device and outputs the relevant audio data, corresponding to the captured data, to the handheld electronic device; and
    wherein the database consists of information about structures and names of daily needed objects, area and places frequently visited by the visually impaired user and names and facial recognition of people who are in regular contact with the visually impaired user.

2. The system to assist a visually impaired user of claim 1, wherein the micro camera is integrally coupled to the eyewear.

3. The system to assist a visually impaired user of claim 1, wherein the micro camera is removable from the eyewear.

4. The system to assist a visually impaired user of claim 1, wherein the handheld electronic device is at least one of a mobile device, a smart phone, a tablet, a smart watch, a wearable device or any computing device.

5. The system to assist a visually impaired user of claim 1, wherein the relevant audio data is further transmitted to the ear wear of the handheld electronic device.

6. The system to assist a visually impaired user of claim 1, wherein the relevant audio data is 1.0-20 seconds long and provides a brief introduction about the objects, places or about the people standing proximally to the visually impaired user.

7. The system to assist a visually impaired user of claim 1, wherein the proximally placed objects are having a unique device ID, wherein the micro camera identify the unique device ID and transmits it to the handheld electronic device.

8. The system to assist a visually impaired user of claim 1, wherein at least one of the proximally placed object are having voice controlled sensor, wherein the voice controlled sensor is enable to respond to the voice of visually impaired user.

9. A computer implemented method to assist a visually impaired user, wherein the computer implemented method comprises:
    receiving a captured data from a micro camera, coupled to an eye wear of the visually impaired user, and a proximity sensor, coupled to a wearable device of the visually impaired user, by a handheld electronic device, wherein the captured data is related to at least one of proximally placed objects, places, people or the combination thereof;

processing the captured data by a database, coupled to the handheld electronic device;

outputting a relevant audio data output, corresponding to the captured data, by the database to the handheld electronic device; and wherein the database consists of information about structures and names of daily needed objects, area and places frequently visited by the visually impaired user and names and facial recognition of people who are in regular contact with the visually impaired user.

10. The computer implemented method of claim 9, wherein the micro camera is integrally coupled to the eyewear.

11. The computer implemented method of claim 9, wherein the micro camera is removable from the eyewear.

12. The computer implemented method of claim 9, wherein the handheld electronic device is at least one of a mobile device, a smart phone, a tablet, a smart watch, a wearable device or any computing device.

13. The computer implemented method of claim 9, wherein the relevant audio data is further transmitted to the ear wear of the handheld electronic device.

14. The computer implemented method of claim 9, wherein the relevant audio data is 10-20 seconds long and provides a brief introduction about the objects, places or about the people standing proximally to the visually impaired user.

15. The computer implemented method of claim 9, wherein the proximally placed objects are having a unique device ID, wherein the micro camera identify the unique device ID and transmits it to the handheld electronic device.

16. The computer implemented method of claim 9, wherein at least one of the proximally placed object are having voice controlled sensor, wherein the voice controlled sensor is enable to respond to the voice of visually impaired user.

* * * * *